(12) United States Patent
Subbaraman et al.

(10) Patent No.: US 11,738,996 B2
(45) Date of Patent: Aug. 29, 2023

(54) POWER GENERATION USING HYDROGEN FUEL WITH ECONOMICAL CARBON DIOXIDE CAPTURE

(71) Applicant: GAS TECHNOLOGY INSTITUTE, Des Plaines, IL (US)

(72) Inventors: Ganesan Subbaraman, Bell Canyon, CA (US); Jeffrey A. Mays, Woodland, CA (US); Ronald J. Stanis, Des Plaines, IL (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 26 days.

(21) Appl. No.: 17/397,512

(22) Filed: Aug. 9, 2021

(65) Prior Publication Data
US 2021/0363006 A1    Nov. 25, 2021

Related U.S. Application Data

(63) Continuation of application No. 16/220,946, filed on Dec. 14, 2018, now Pat. No. 11,084,720, which is a
(Continued)

(51) Int. Cl.
*C01B 3/38* (2006.01)
*F02C 7/22* (2006.01)
(Continued)

(52) U.S. Cl.
CPC ............ *C01B 3/38* (2013.01); *B01D 53/48* (2013.01); *B01D 53/62* (2013.01); *B01D 53/82* (2013.01);
(Continued)

(58) Field of Classification Search
CPC ....... C01B 3/38; C01B 3/44; C01B 2203/043; C01B 2203/0475; C01B 2203/84;
(Continued)

(56) References Cited

U.S. PATENT DOCUMENTS

| 7,931,712 B2 | 4/2011 | Zubrin et al. |
| 8,105,541 B2 | 1/2012 | Stewart et al. |

(Continued)

FOREIGN PATENT DOCUMENTS

| WO | WO 2008/039783 A2 | 4/2008 |
| WO | WO 2011/060556 A1 | 5/2011 |

(Continued)

OTHER PUBLICATIONS

Ana L. Garcia-Lario et al., "Performance of a combined Cao-based sorbent and catalyst on H2 production, via sorption enhanced methane steam reforming," Chemical Engineering Journal 264 (2015) 697-705, (9 pages).
(Continued)

*Primary Examiner* — Steven J Bos
*Assistant Examiner* — Syed T Iqbal
(74) *Attorney, Agent, or Firm* — Pauley Erickson & Swanson (57) ABSTRACT

Systems and methods for generating power using hydrogen fuel, such as derived from natural gas, are provided. Feed materials are introduced into a compact hydrogen generator to produce carbon dioxide, hydrogen gas and steam. Sorbent material within the compact hydrogen generator acts to absorb carbon dioxide, forming a used sorbent. Hydrogen gas and steam are separated from the used sorbent and passed to a power generator such as a hydrogen turbine to produce power. The used sorbent is introduced into a calciner and heated to desorb carbon dioxide and form a regenerated sorbent which can be recycled to the compact hydrogen generator.

18 Claims, 6 Drawing Sheets

Related U.S. Application Data continuation-in-part of application No. 15/892,616, filed on Feb. 9, 2018, now abandoned, which is a continuation-in-part of application No. 15/165,521, filed on May 26, 2016, now Pat. No. 10,227,234.

(60) Provisional application No. 62/697,285, filed on Jul. 12, 2018, provisional application No. 62/456,993, filed on Feb. 9, 2017, provisional application No. 62/167,871, filed on May 28, 2015.

(51) Int. Cl.

| | |
|---|---|
| *F01K 23/10* | (2006.01) |
| *B01D 53/62* | (2006.01) |
| *B01D 53/96* | (2006.01) |
| *B01D 53/82* | (2006.01) |
| *B01D 53/48* | (2006.01) |
| *F02C 3/20* | (2006.01) |
| *B01D 53/83* | (2006.01) |
| *C01B 3/44* | (2006.01) |

(52) U.S. Cl.
CPC .............. *B01D 53/83* (2013.01); *B01D 53/96* (2013.01); *C01B 3/44* (2013.01); *F01K 23/10* (2013.01); *F01K 23/106* (2013.01); *F02C 3/205* (2013.01); *F02C 7/22* (2013.01); *B01D 2251/404* (2013.01); *B01D 2251/602* (2013.01); *B01D 2256/16* (2013.01); *B01D 2257/504* (2013.01); *C01B 2203/0233* (2013.01); *C01B 2203/043* (2013.01); *C01B 2203/0425* (2013.01); *C01B 2203/0475* (2013.01); *C01B 2203/1241* (2013.01); *C01B 2203/1258* (2013.01); *C01B 2203/84* (2013.01); *Y02C 20/40* (2020.08); *Y02E 20/18* (2013.01)

(58) Field of Classification Search
CPC .... C01B 2203/0233; C01B 2203/0425; C01B 2203/1241; C01B 2203/1258; B01D 53/83; B01D 53/62; B01D 53/96; B01D 53/82; B01D 53/48; B01D 2251/602; B01D 2256/16; B01D 2257/504; B01D 2251/404; F02C 3/205; F02C 7/22; F01K 23/10; F01K 23/106; Y02C 20/40; Y02E 20/18; Y02E 20/16; Y02P 20/129; Y02P 30/00; Y02P 20/151
See application file for complete search history.

(56) References Cited

U.S. PATENT DOCUMENTS

| | | |
|---|---|---|
| 8,241,374 B2 | 8/2012 | Bavarian et al. |
| 9,174,844 B2 | 11/2015 | Ramkumar et al. |
| 2004/0261617 A1 | 12/2004 | Stewart |
| 2005/0232855 A1 | 10/2005 | Stevens et al. |
| 2007/0000177 A1* | 1/2007 | Hippo .................. C10J 3/06 48/210 |
| 2008/0145309 A1 | 6/2008 | Bavarian et al. |
| 2008/0227626 A1 | 9/2008 | Essaki et al. |
| 2009/0263316 A1* | 10/2009 | Iyer .................. C01B 3/386 423/658.3 |
| 2010/0284904 A1 | 11/2010 | Castaldi et al. |
| 2012/0011856 A1* | 1/2012 | Wright .................. C01B 3/56 60/780 |
| 2012/0156574 A1 | 6/2012 | Kandaswamy et al. |
| 2016/0347611 A1 | 12/2016 | Mays et al. |
| 2018/0162729 A1 | 6/2018 | Subbaraman et al. |
| 2019/0112188 A1 | 4/2019 | Subbaraman et al. |

FOREIGN PATENT DOCUMENTS

| | | | |
|---|---|---|---|
| WO | WO-2011060556 A1 * | 5/2011 | ........... B01D 53/047 |
| WO | WO 2016/191678 A1 | 12/2016 | |

OTHER PUBLICATIONS

Wiranarongkorn et al., "Analysis of the Ca-looping sorption enhanced steam reforming and solid oxide fuel integrated process using bio-oil," Energy Conversion and Management, Elsevier Science Publishers. Oxford, GB, vol. 134, Dec. 23, 2016 (11 Pages).

Cobden et al., "Sorption-enhanced hydrogen production for pre-combustion CO2 capture. Thermodyanmic analysis and experimental results," International Journal of Greenhouse Gas Control, I, Apr. 1, 2007 (10 pages).

Romana et al., "Application of the Sorption Enhanced-Steam Reforming process in combined cycle-based power plants," Energy Proccedia 4, Apr. 1, 2011 (8 pages).

Martinez et al., "Hydrogen production through sorption enhanced steam reforming of natural gas: Thermodynamic plant assessment," International Journal of Hydrogen Energy, Elsevier Science Publishers B.V., Barking, GB, Oct. 11, 2013 (20 pages).

\* cited by examiner

POWER GENERATION USING HYDROGEN FUEL WITH ECONOMICAL CARBON DIOXIDE CAPTURE

CROSS REFERENCE TO RELATED APPLICATIONS

This application is a continuation of U.S. patent application Ser. No. 16/220,946, filed on 14 Dec. 2018, and issued as U.S. Pat. No. 11,084,720, which claims the benefit of U.S. Provisional Patent Application, Ser. No. 62/697,285, filed on 12 Jul. 2018, and Ser. No. 16/220,946 is a continuation-in-part application of U.S. patent application Ser. No. 15/892,616, filed on 9 Feb. 2018 and which patent application is a continuation-in-part patent application of U.S. Ser. No. 15/165,521, filed on 26 May 2016 and which claims the benefit of U.S. Provisional Application 62/167,871, filed 28 May 2015. The Ser. No. 15/892,616 patent application also claims the benefit of U.S. Provisional Patent Application, Ser. No. 62/456,993, filed on 9 Feb. 2017. Each of these cross referenced applications, including the co-pending parent application(s), are hereby incorporated by reference herein in their entirety and are made a part hereof, including but not limited to those portions which specifically appear hereinafter.

BACKGROUND OF THE INVENTION

Field of the Invention

This invention relates generally to power generation and, more particularly, to the generation of power using hydrogen turbines and, more particularly, to fuel sources for such turbines, particularly, hydrogen fuel such as derived from natural gas.

Description of Related Art

As discussed in the above-identified prior U.S. patent application Ser. No. 15/892,616, the current state of the art turbine or heat engine system for converting natural gas to electric power, hydrogen, and carbon dioxide with 90% $CO_2$ separation relies on reforming natural gas to hydrogen and carbon dioxide using a traditional Steam Methane Reformer (SMR) for conversion of methane and steam to syngas and a water gas shift reactor for conversion of the syngas to hydrogen and carbon dioxide. The carbon dioxide is separated from the hydrogen using an amine absorption column. A secondary amine absorption system is utilized to separate the carbon dioxide from the reformer firebox flue gas, maximizing the carbon dioxide available for sale or reuse. The hydrogen is then optionally purified using a Pressure Swing Absorption (PSA) system before being used as fuel in a gas turbine modified for hydrogen fuel or in an advanced hydrogen turbine. A heat recovery steam generator in conjunction with a steam turbine are used in a bottoming cycle for high efficiency.

Key shortcomings of such a power generation system with or via hydrogen include the large required footprints and capital expenses associated with the two step conversion reactors, separation of the hydrogen from the carbon dioxide, and the amine system. Moreover, such a system suffers from a significant energy penalty due to the generally low conversion efficiency of the SMR, hydrogen separation, and regeneration of the amine system. In addition, SMRs and associated amine systems are well known to be difficult to modularize and scale down.

The combustion of hydrogen or hydrogen-rich fuel in a gas turbine or an advanced hydrogen turbine requires means to attemperate the combustion process such as by use of a quench gas, e.g., steam. Unfortunately, the separate making and appropriate mixing of a quench gas such as steam with hydrogen or hydrogen-rich flue stream for such turbines can be unduly troublesome or problematic.

In addition, in existing power plants such as Natural Gas Combined Cycle (NGCC) plants, NOx emissions are typically reduced using expensive Selective Catalytic Reduction (SCR) equipment. A complete and economic solution to combustion and pollutant (NOx) control has yet to be demonstrated in conjunction with the use of hydrogen-burning turbines.

SUMMARY OF THE INVENTION

The invention takes advantage of the presence of excess steam produced by the Compact Hydrogen Generator (CHG). Thus the product stream from the CHG is well suited for use in or with a combustion turbine. In the case of hydrogen required, for example, in a refinery, additional processes (e.g., heat exchangers, Pressure Swing Adsorption equipment, etc.) will typically be required. In the absence of these, the output from a CHG becomes an economical and $CO_2$-free fuel for power production while at the same time enabling reduction of traditional criteria pollutants such as NOx as, for example, the inclusion and use of such an attemperant also serves to lower undesirable NOx emissions.

The subject invention encompasses innovative, compact and scalable devices, systems and processes for direct production of hydrogen ($H_2$) from natural gas as an alternative to steam methane reformers. The Compact Hydrogen Generator (CHG) process described herein may desirably utilize calcium oxide (CaO) as a sorbent for the in-situ removal of by-product carbon dioxide which directly produces a 92+ vol % pure $H_2$ product, resulting in lower equipment costs, higher $H_2$ yields and a concentrated $CO_2$ product stream suitable for Carbon Capture and Sequestration (CCS) or other applications such as Enhanced Oil recovery (EOR).

As detailed below, the ability to utilize a sorbent such as CaO is facilitated and/or made possible by the novel use of a bubbling fluidized bed of catalyst particles with the sorbent, e.g., CaO, being injected such as with steam and/or natural gas (methane) or a mixture thereof. The sorbent, e.g., CaO, preferably has a fine particle size and is elutriated through the catalyst bed during which it absorbs or otherwise binds with or picks-up the $CO_2$ such as CaO converting to calcium carbonate ($CaCO_3$).

Particular aspects and embodiments of the subject invention advantageously utilize a Compact Hydrogen Generator for the economical production of electricity. As detailed below, specific systems and methods in accordance with the subject development take advantage of CHG's low CAPEX (lower than current SMR technology) and the capability of the subject development to separate $CO_2$ without additional equipment which makes concurrent $CO_2$ capture more economical. Techno-economic evaluations show that systems and methods in accordance with the subject development to be superior to current Natural Gas Combined Cycle (NGCC) or hydrogen from Steam Methane Reformer (SMR) plants to produce power with $CO_2$ capture. In an embodiment of this invention, the system's performance is further improved by replacing gas turbines with an advanced hydrogen turbine, for example with a turbine similar to the turbine developed for an Integrated Gasification Combined Cycle (IGCC) plant with $CO_2$ capture.

In accordance with one aspect of the subject development, a system for power generation is provided. In one embodiment, the system includes a compact hydrogen generator. The compact hydrogen generator contains a quantity of a sorbent material. A feed material to the compact hydrogen generator produces $H_2$ product and carbon dioxide and the sorbent material absorbs carbon dioxide and forms a used sorbent. The system further includes a gas/solids separator connected to the compact hydrogen generator to separate the $H_2$ product and the used sorbent. A calciner connected to the gas/solids separator serves to heat the used sorbent to desorb carbon dioxide from the used sorbent to produce regenerated sorbent. A separate stream of $CO_2$ can be released from the calciner. A recycle line from the calciner to the compact hydrogen generator serves to recycle at least a portion of the regenerated sorbent to the compact hydrogen generator.

In particular embodiments, systems for power generation in accordance with the invention use or utilize hydrogen, for example, as fuel. As detailed below, systems for power generation using hydrogen fuel can usefully derive such hydrogen fuel from natural gas.

A system for power generation from natural gas via use of hydrogen fuel in accordance with one embodiment includes a compact hydrogen generator for generating $H_2$ product from feed materials including natural gas and water. The compact hydrogen generator includes a bubbling fluidized bed of reforming catalyst and a sorb ent, e.g., an elutriated sorbent, for the direct catalytic conversion of natural gas and water/steam to $H_2$ product, wherein the feed materials produce the $H_2$ product and carbon dioxide and the sorbent material absorbs carbon dioxide and forms a used sorbent. A gas/solids separator is connected to the compact hydrogen generator to separate the $H_2$ product and the used sorbent. An indirect calciner is connected to the gas/solids separator to heat the used sorbent to desorb carbon dioxide from the used sorbent to produce regenerated sorbent and a quantity of high purity carbon dioxide. A recycle line is included to introduce at least a portion of the regenerated sorbent from the indirect calciner to the compact hydrogen generator. The system further includes at least one power generator to receive and utilize at least a portion of the $H_2$ product from the gas/solids separator to produce power.

Useful power generators may take various forms including turbines, such as gas or hydrogen turbines, for example, or reciprocating engines, with suitable power generators connected to appropriately produce electrical and/or mechanical (e.g., shaft) power.

A system for power generation in accordance with one embodiment includes a compact hydrogen generator, a gas/solids separator connected to the compact hydrogen generator, a calciner connected to the gas/solids separator, a recycle line between the calciner and the compact hydrogen generator, and at least one joined or connected power generator. The compact hydrogen generator contains a quantity of a sorbent material and serves to produce generator products including $H_2$, carbon dioxide, and steam when feed material is introduced therein. The sorbent material absorbs carbon dioxide and forms a used sorbent. The gas/solids separator serves to separate the used sorbent from the $H_2$ and steam. The calciner serves to heat the used sorbent to desorb carbon dioxide from the used sorbent to produce regenerated sorbent. The recycle line serves to introduce at least a portion of the regenerated sorbent from the calciner to the compact hydrogen generator. The at least one power generator serves to receive and utilize at least a portion of the $H_2$ product and steam from the gas/solids separator to produce power. In accordance with a preferred embodiment, the compact hydrogen generator has a steam to carbon ratio operating range between 2.5:1 to 4:1 and produces generator products having a steam to hydrogen ratio (volume basis) of between 1:8 and 1:2.

In accordance with another aspect of the subject development, a method for producing power via hydrogen gas is provided. In one embodiment, such a method involves introducing feed material into a sorbent enhanced reformer to produce $H_2$ product and carbon dioxide. The sorbent enhanced reformer contains a quantity of a sorbent material to absorb carbon dioxide and form a used sorbent. The $H_2$ product and used sorbent from the sorbent enhanced reformer are introduced into a gas/solids separator to separate the $H_2$ product from the used sorbent. At least a portion of the separated $H_2$ product is introduced into at least one hydrogen turbine to produce power. At least a portion of the separated used sorbent is introduced into a calciner and heated to desorb carbon dioxide from the used sorbent to produce regenerated sorbent and $CO_2$. At least a portion of the regenerated sorbent can subsequently be desirably recycled to the sorbent enhanced reformer.

A method for producing power via hydrogen gas, in accordance with one embodiment, involves introducing feed material into a sorbent enhanced reformer to produce products including $H_2$, carbon dioxide, and steam. The sorbent enhanced reformer contains a quantity of a sorbent material to absorb carbon dioxide and form a used sorbent. The $H_2$, steam and used sorbent from the sorbent enhanced reformer are introduced into a gas/solids separator to separate the $H_2$ and steam from the used sorbent. At least a portion of the separated $H_2$ and steam are introduced into at least one power generator to produce power. At least a portion of the separated used sorbent is introduced into a calciner to heat the used sorbent to desorb carbon dioxide from the used sorbent to produce regenerated sorbent and $CO_2$. At least a portion of the regenerated sorbent is recycled to the sorbent enhanced reformer. In accordance with a preferred embodiment, the sorbent enhanced reformer has a steam to carbon ratio operating range between 2.5:1 to 4:1 and produces products having a steam to hydrogen ratio (volume basis) of between 1:8 and 1:2.

As used herein, references to a hydrogen generator as being "compact" are to be understood to refer to a hydrogen generator that is smaller in plant footprint and height as compared to conventional processing and systems for hydrogen generation, such as identified above. This is due to significantly smaller reactor volumes, elimination of components (for example, no water gas shift reactors), and/or reduced equipment size (for example, smaller steam drums and purification systems.

As used herein, references to "high purity" hydrogen are to be understood to generally refer to hydrogen purity of greater than 90% by volume on a dry gas basis.

As used herein, references to "high purity" carbon dioxide are to be understood to generally refer to carbon dioxide purity of at least 95% by volume and preferably at least 99% by volume.

Other objects and advantages will be apparent to those skilled in the art from the following detailed description taken in conjunction with the appended claims and drawings.

DETAILED DESCRIPTION

As described in greater detail below, the hydrogen or hydrogen-rich fuel product from a CHG solves the problem of having to separately create and mix steam with the fuel product to accomplish proper and near pollutant-free combustion.

Figure 1:
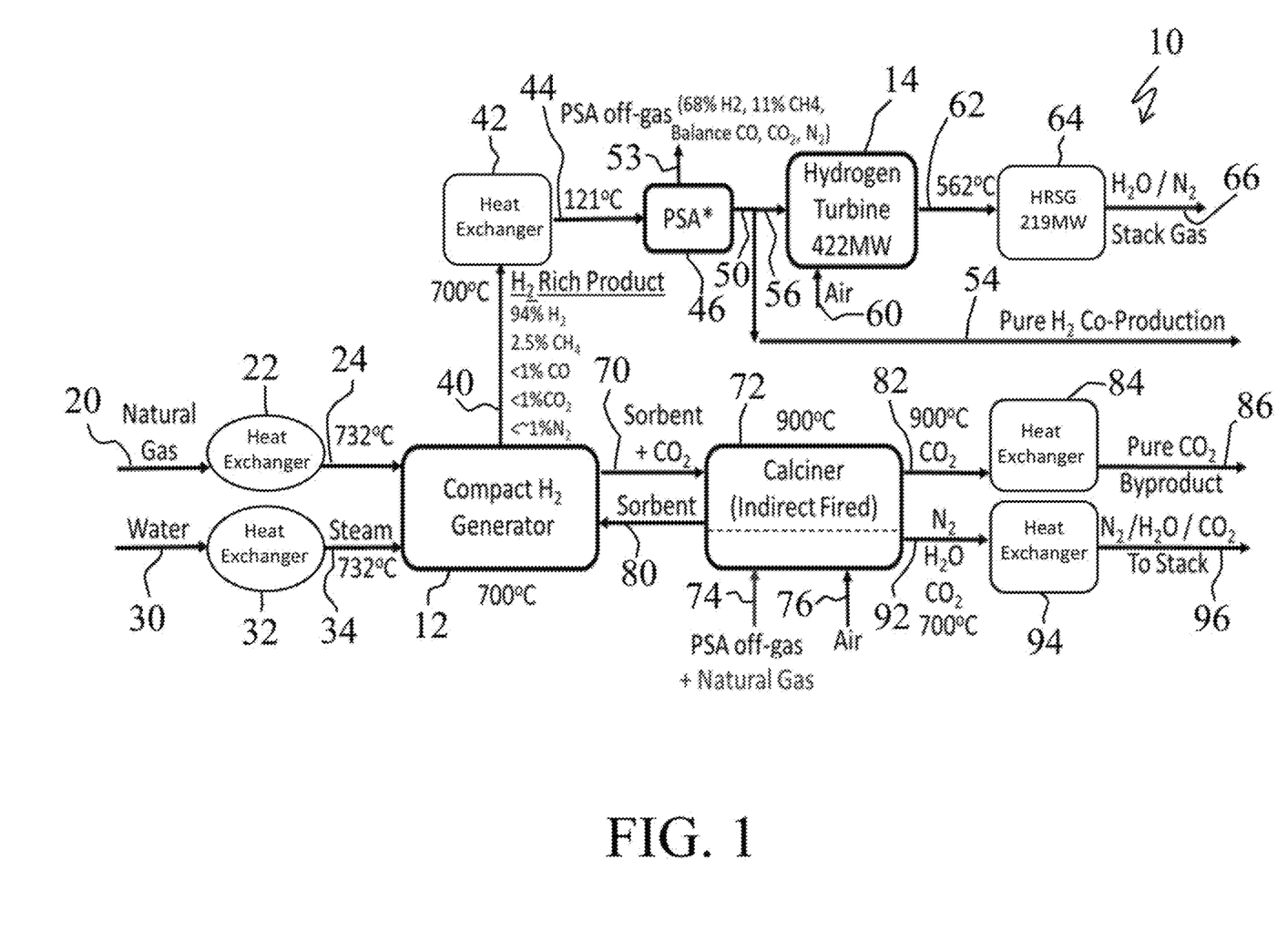
FIG. 1 is a simplified schematic for a system for converting natural gas assets to electric power, hydrogen and carbon dioxide, in accordance with one embodiment of the subject invention.

FIG. 1 presents a system, generally designated with the reference numeral 10, for converting natural gas assets to electric power, hydrogen and carbon dioxide, in accordance with one embodiment of the subject development. The system 10 includes and utilizes a compact hydrogen generator 12 appropriately joined or connected to a gas turbine or a hydrogen turbine 14 such as to desirably convert natural gas assets to electric power.

While the broader practice of the subject development is not necessarily limited to use with compact hydrogen generators of specific or particular construction or operation, as detailed below, the subject development can desirably be practiced with compact hydrogen generators for a one-step hydrogen generation with inherent separation of carbon dioxide such as can be desirably achieved through the utilization of a bubbling fluidized bed of: 1) a reforming catalyst for the catalytic conversion of methane to the $H_2$ product and 2) a sorbent (e.g., CaO) for in-situ removal of by-product carbon dioxide thus producing high-purity hydrogen.

The process chemistry and the principles of operation of, for or associated with a compact hydrogen generator, such as herein provided and used, will now be discussed making reference to FIG. 2.

Figure 2:
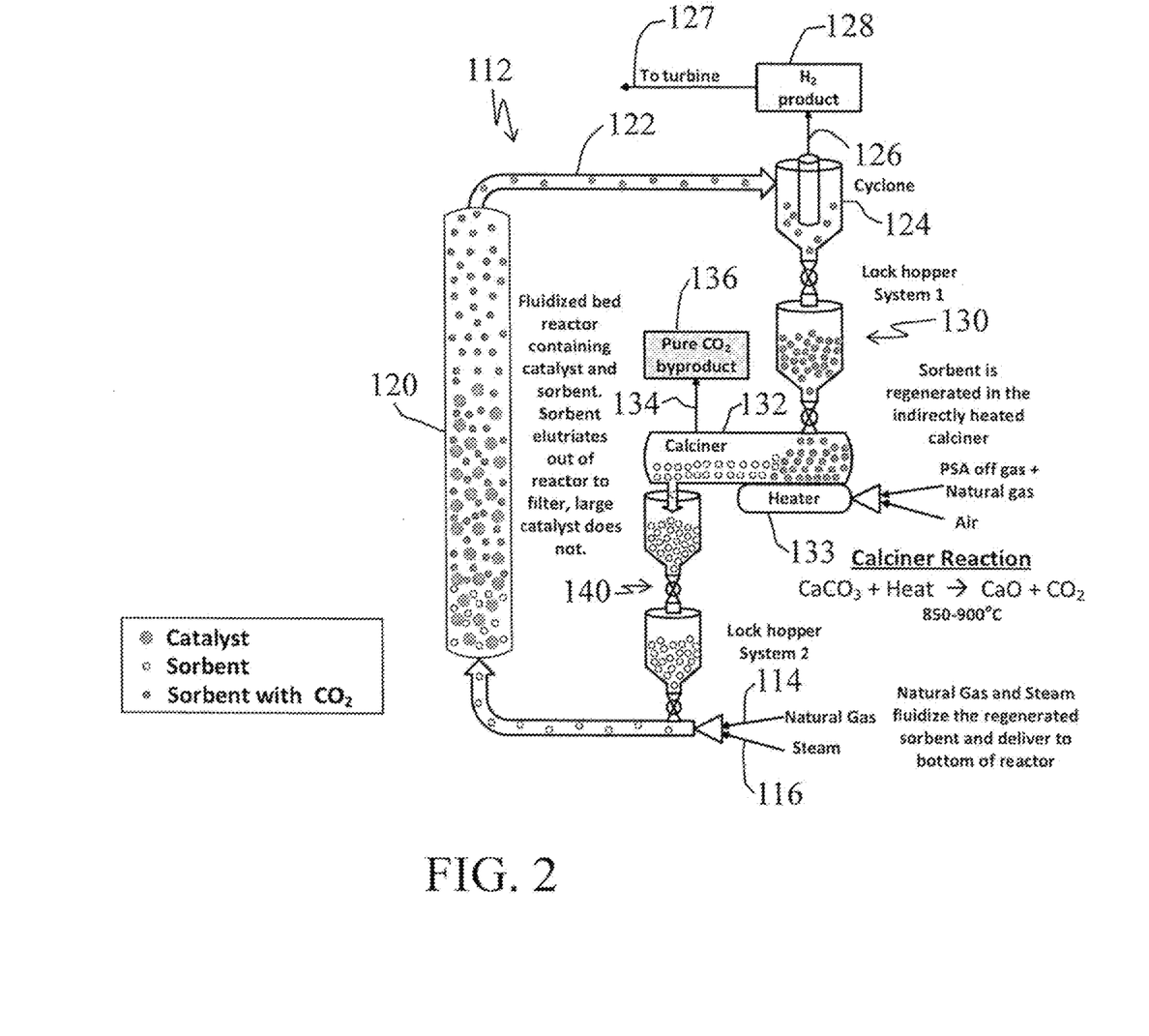
FIG. 2 is a simplified schematic showing the principles of operation for a compact hydrogen generator and associated processing in accordance with one embodiment of the subject development.

FIG. 2 is a simplified schematic showing the principles of operation for a compact hydrogen generator 112.

As shown in FIG. 2, such a compact hydrogen generator provides a closed loop operation that produces hydrogen and regenerates the sorbent, i.e., calcium oxide. More particularly, sorption enhanced steam methane reforming hydrogen generation occurs via the following reactions:

$$CH_4 + 2H_2O + \text{Heat}(a) \rightarrow 4H_2 + CO_2 \quad (1)$$

$$CaO + CO_2 \rightarrow CaCO_3 + \text{Heat}(b) \quad (2)$$

$$CH_4 + 2H_2O + CaO \rightarrow 4H_2 + CaCO_3 \quad (3)$$

where the CaO latent heat duty is ~95% of the reforming process heat duty, i.e., Heat(b)=~95% Heat(a)

and where calcination occurs via the following reaction:

$$CaCO_3 + \text{Heat} \rightarrow CaO + CO_2 \quad (4)$$

for a compact hydrogen generator in accordance with one embodiment of the subject development.

Once the CaO reactant passes through the catalyst bed, it is entrained with the product $H_2$ and can be separated using internal cyclones similar to a fluidized catalytic cracking (FCC) operation. The $CaCO_3$ is then transferred to a second unit operation wherein it is rapidly heated in a gas phase transport calciner to reject the $CO_2$ and produce CaO for reuse in the $H_2$ generator reactor.

The entire process is intensified by: (1) the elimination of the syngas production step; (2) avoiding the indirect firing/heat transfer approach used in SMR's; and (3) recapturing the sensible heat from the direct fired calciner. In addition, use of conventional construction materials, smaller equipment size, and the high purity of the $H_2$ product make for a significant reduction in plant footprint and capital costs. The process is also steam neutral. Cost of $H_2$ product, the principal figure of merit of a $H_2$ plant, is thereby significantly less than from SMR. As further detailed herein, processing in accordance with the subject development can drastically simplify process equipment and deliver high efficiency by way of low-cost, steam neutral processing.

$CO_2$ is captured in the CHG as a separate and concentrated stream at pressure. Desirably the CHG-produced $H_2$ can be converted to electric power (using conventional gas turbines or advanced hydrogen turbines). The resulting $CO_2$ may also find practical use such as in enhanced oil recovery (EOR) or in co-production of urea in conjunction with use of the $H_2$ for ammonia production, for example.

As shown in FIG. 2, natural gas and steam are introduced, such as via respective streams 114 and 116, into a fluidized bed reactor 120 containing reforming catalyst and sorbent material and such as operating at catalytic reforming conditions of 700° C. and 20-35 psig. As shown, the natural gas and/or the steam may desirably serve to fluidize regenerated sorbent (described more fully below) and deliver such regenerated sorbent to the bottom of the fluidized bed reactor.

Those skilled in the art and guided by the teachings herein provided will understand and appreciate that the broader practice of the subject development is not necessarily limited by or to the incorporation and/or use of specific or particular catalyst materials and/or sorbents. Suitable reforming catalyst materials for use in the practice of the subject development include commercially available Ni on alumina, for example. Suitable sorbents for use in the practice of the subject development include natural sorbents such as limestone or dolomite, for example. Further, the fluidized bed reactor, the catalyst material and the sorbent are desirably sized, designed and selected such that the used sorbent can elutriate out of the reactor and the catalyst material is sized to not elutriate out of the reactor and thus remains in the fluidized bed. For example, in one embodiment, a solid sorbent of limestone or dolomite of <0.2 mm diameter and a catalyst of Ni on alumina of 2 mm diameter can be used.

The fluidized bed reactor 120 produces or results in hydrogen generation such as by the above-identified sorption enhanced steam methane reforming hydrogen generation reactions.

The resulting gases and sorbent (used and unused) from the fluidized bed reactor 120 are conveyed via a line 122 to a gas/solids separator 124 (such as one or more cyclones) to effect separation of gases shown as a stream 126 (such stream being largely composed of $H_2$, but may also contain some $CO_2$, CO, $N_2$, unreacted $CH_4$, and steam for example) from the solids. For example, a typical or expected composition breakdown of the stream 126 is, on a dry basis: >94% $H_2$; ~2.5% $CH_4$; and ~2-3% CO, $CO_2$ and $N_2$ and on a wet basis: >75% $H_2$; ~2% $CH_4$; and ~2.8% CO, $CO_2$ and $N_2$ and the balance steam (such as for NOx control). The $H_2$, with or without further processing may be appropriately passed or conveyed (such as signified by the arrow 127) to a selected power generator such as a turbine, reciprocating engine or the like for appropriate power production or for other use or storage, as may be desired and as represented by box 128. Such processing costs in the case of an SMR are expensive, having to remove significant amount of $CO_2$ and $H_2$ from the water gas shift reactor.

The solids may be appropriately conveyed, such as via a lock hopper system 130 or the like to a calciner 132 wherein the used sorbent is indirectly heated such as via an associated heater 133 to a temperature of 850-900° C. such as by using PSA off-gas and/or natural gas fuel and oxidizer, e.g., air, to regenerate the sorbent such as by desorbing $CO_2$.

The resulting desorbed pure $CO_2$ byproduct is passed from the calciner 132 via a line 134 to storage or disposal 136. Such $CO_2$ may, for example, find use in enhanced oil recovery (EOR), or in co-production of urea in conjunction with use of the $H_2$ for ammonia production.

The resulting regenerated sorbent may be appropriately conveyed, such as via a lock hopper system 140 or the like to ultimately be reintroduced into the fluidized bed reactor 120 such as via the natural gas and/or steam feed materials introduced into the reactor.

The process is thus desirably engineered by combining two unit operations. In the a first unit, the sorbent, e.g., CaO, selectively absorbs carbon dioxide in the reforming (Hydrogen Generator) reactor while being elutriated through the fluidized bed of catalyst, forming hydrogen and $CaCO_3$ as a fine solid. The hydrogen goes to a selected power generator (e.g., a turbine or other selected power generator) for power production and the $CaCO_3$ is then separated and sent to a calciner. In the calciner unit, heat is added to remove the carbon dioxide and returns the regenerated CaO with its latent heat to the reforming reactor. The system may also be designed to allow for excess hydrogen production for sale to local markets (e.g., refineries, fuel cell vehicles, etc.).

A key performance driver for systems and processes in accordance with one aspect of the subject development is the impact on the Cost of Electricity (COE), which combines CAPEX and OPEX improvements through system efficiency. In this regard, the CHG based system squarely addresses at least some of the shortcomings associated the above-identified and described state-of-the-art processing and systems by having carbon dioxide separation inherent to the process. This feature drastically reduces the CAPEX parasitic losses such as required in the regeneration of amine systems for SMR-based systems. The CHG's cold gas efficiency is increased due to the lower reactor temperature and due to the Le Chatelier's shift of carbon monoxide to carbon dioxide due to the presence of sorbent.

Moreover, CHG overcomes the cost impact due to or associated with scaling limitations of the above-identified and described state-of-the-art processing and systems as the hydrogen production reactor eliminates the complexity of the firebox and reactor tube arrangement in an SMR. The CHG, for example, utilizes a bubbling fluidized bed with the sorbent being elutriated through the bed. Since the sorbent provides the necessary heat arising from the recarbonation reaction, the fluidized bed can desirably be housed within a simple pressure vessel. Moreover, the challenges of modularization are minimized or desirably overcome with the CHG technology by eliminating several processes (e.g., water-gas shift and carbon dioxide separation) and greatly simplifying the heat integration. In addition, the overall size of the CHG system is significantly smaller than commercial SMR system. For example, the elimination of the firebox alone may desirably serve to reduce the hydrogen generator size by 90% or more.

Such one-step hydrogen generation and inherent separation of carbon dioxide make such systems and processing superior against current technologies for hydrogen production. Further, such compact systems have a wide range of potential applications such as in power, refining, upgrading, transportation using hydrogen, and in various chemical industries.

Returning to FIG. 1 and as shown therein, natural gas 20 can be pre-heated such as by passage through a heat exchanger 22 to form a heated stream of natural gas 24 (e.g., heated to a temperature of 732° C.) passed through to the compact hydrogen generator 12. Water, such as in the form of a stream 30, can be heated, such as by passage through a heat exchanger 32 to form a steam stream 34 (e.g., heated to a temperature of 732° C.) that is also passed through to compact hydrogen generator 12.

The compact hydrogen generator 12, operating such as described above at a temperature of 700° C. results in an $H_2$ rich gas stream 40 such as at about 700° C. and such as processed through a heat recovery heat exchanger 42 to form a stream 44 such as having a reduced temperature such as 121° C. If desired and as shown, the stream 44 can be processed through a pressure swing absorber 46 such as to desirably increase or maximize hydrogen purity and carbon dioxide separation, forming a $H_2$ product stream 50 of increased purity and a PSA off-gas stream 52 largely containing the non-hydrogen gases.

If desired, a portion of the $H_2$ product stream 50 may be diverted, such as represented by the stream 54, for other uses.

The non-diverted portion of the $H_2$ product stream 50 can be passed such as via a stream 56 to the hydrogen turbine 14 and such as having air fed thereto such as via a stream 60 such as to produce electric power.

A flue gas stream 62, such as having a temperature of 562° C. is passed to a heat recovery steam generator 64 such has to desirably recover at least a portion of the heat therefrom and the formation of a stack gas stream 66 for appropriate disposal.

Those skilled in the art and guided by the teachings herein provided will understand and appreciate that power output values identified on, in or in association with the systems and associated drawings herewith provided are illustrative as systems in accordance with the invention may appropriately be operated to provide a selected power output from a wide range of power outputs.

FIG. 1 shows a stream 70 such as including used sorbent, e.g., sorbent material that absorbed $CO_2$, being passed from the compact hydrogen generator 12 to a calciner 72, preferably an indirect fired calciner. Also introduced to the calciner 72 is a stream 74, such as composed of PSA off-gas and/or natural gas, and a stream 76 of oxidant material, e.g., air. The calciner operates at a temperature sufficiently high, e.g., 900° C., to effect regeneration of the sorbent via desorption of $CO_2$ from the sorbent.

Regenerated sorbent via a stream 80 is passed from the calciner 72 back to the compact hydrogen generator 12.

A stream 82 of high purity $CO_2$, such as at a temperature of about 900° C., may if desired be passed from the calciner 72 to a heat recovery heat exchanger 84 prior to passage of the pure $CO_2$ byproduct stream 86 to disposal or other use or uses.

A stream 92 of combustion product gases, such as at a temperature of about 700° C., may if desired be passed to a heat recovery heat exchanger 94 prior to passage of a stream 96 of the resulting gases to disposal or other uses.

In accordance with one preferred embodiment, the compact hydrogen generator desirably operates at a pressure of at least 35 psia to produce the $H_2$ product and carbon dioxide. Further, in accordance with one preferred embodiment, the calciner operates at atmospheric pressure to heat the used sorbent to desorb carbon dioxide from the used sorbent to produce regenerated sorbent. By operating the compact hydrogen generator at pressures above 35 psia reduces the compressor power and size to typical delivery pressures of 365 psia. Thus reducing both capital and operating costs. By operating the calciner at atmospheric pressure, the system provides an essentially pure $CO_2$ stream, and reduces the calcination temperature. The latter is beneficial for increasing the cyclic life of the sorbent and for improving operations and system reliability.

While the system 10 shown in FIG. 1 and described above relate to an embodiment wherein the $H_2$ rich gas stream 44 is processed through a pressure swing absorber 46 such as to desirably increase or maximize hydrogen purity and carbon dioxide separation, those skilled in the art and guided by the teachings herein provided will understand and appreciate that the broader practice of the subject development is not necessarily so limited. For example, if desired, the subject development can be applied via system and processing wherein none or a selected portion of the $H_2$ product is processed or treated in such, similar or like manner for purposes of increased or maximized hydrogen purity.

Figure 3:
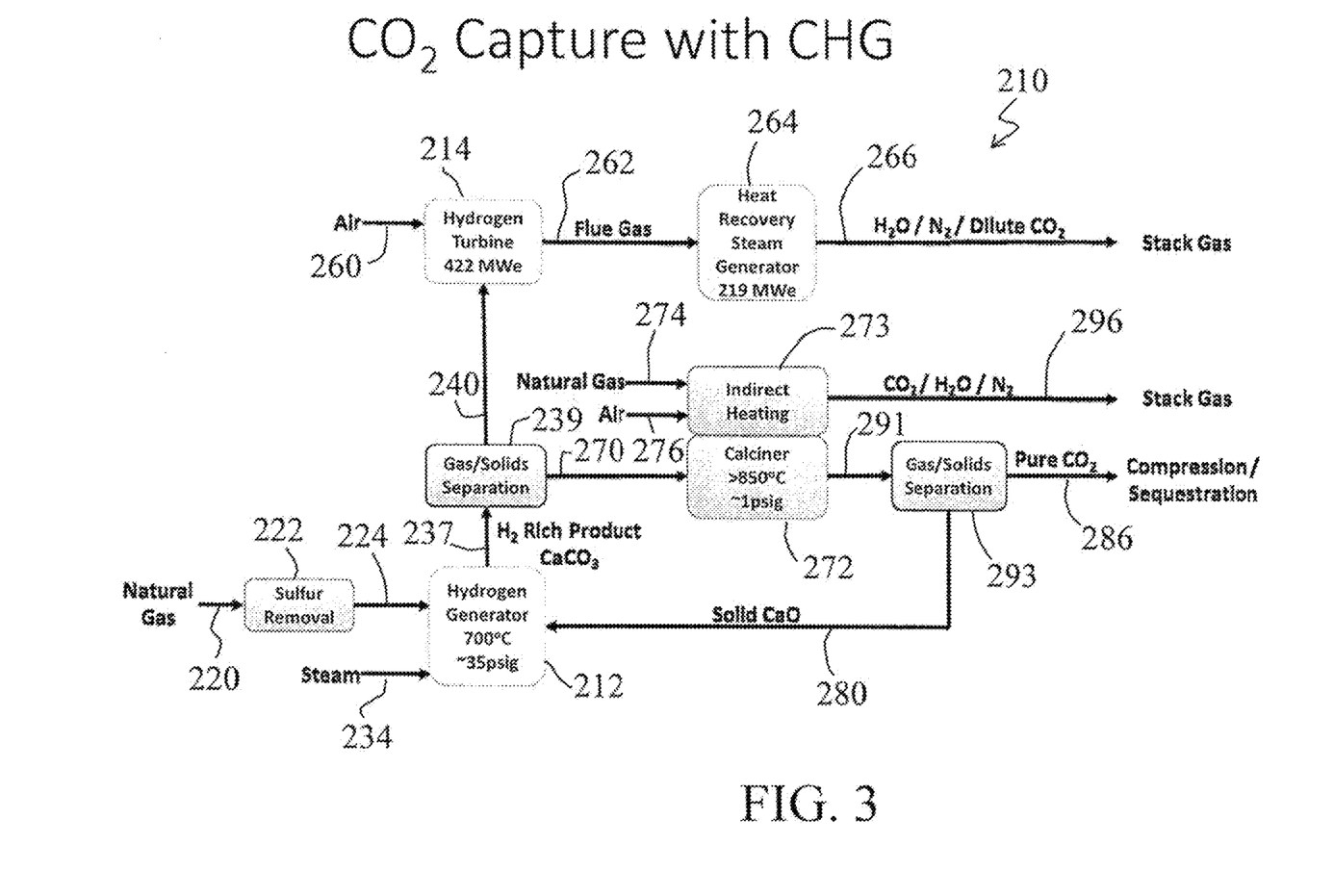
FIG. 3 is a simplified schematic for a system for converting natural gas assets to electric power, hydrogen and carbon dioxide, in accordance with another embodiment of the subject development.

Turning to FIG. 3 there is shown a schematic for a system, generally designated by the reference numeral 210, for converting natural gas assets to electric power, hydrogen and carbon dioxide, in accordance with another embodiment of the subject development.

The system 210 is in many respects similar to the system 10 shown in FIG. 1 and described above. For example, the system 210, similar to the system 10, includes a hydrogen generator 212 and a hydrogen turbine 214.

Natural gas 220 and steam 234 are introduced into the hydrogen generator 212. As shown, natural gas 220 may undergo sulfur removal, such as by treatment through a desulfurizer unit 222, such as known in the art, to remove sulfur from the natural gas prior to passage, such as in a stream 224 to the compact hydrogen generator 212. The hydrogen generator 212 produces a stream 237 containing the $H_2$-rich product and with $CO_2$ desirably in a captured form with the absorbent, e.g., $CaCO_3$.

The stream 237 is passed to a gas/solids separator 239 such as described above. As a result of gas/solids separation via the separator 239, there is produced or formed a $H_2$-rich gaseous product stream 240 and a used sorbent solids stream 270.

The typical or expected composition breakdown of the $H_2$-rich gaseous product stream 240 is 75% $H_2$; ~2% $CH_4$; and ~2.8% CO, $CO_2$ and $N_2$ and the balance steam (such as for NOx control). The $H_2$-rich gaseous product stream 240 is passed to the hydrogen turbine 214. As will be appreciated, if desired, the $H_2$-rich gaseous product stream 240 may undergo further processing such as described above in reference to the system 10 shown in FIG. 1 prior to passage to the hydrogen turbine 214.

The turbine 214, similar to the turbine 14 described above, may include or have a stream 260 of air or other desired oxidant supplied thereto for use in the production of electric power.

A flue gas stream 262 is passed to a heat recovery steam generator 264 such has to desirably recover at least a portion of the heat therefrom and the formation of a stack gas stream 266 for appropriate disposal.

A stream 270 such as including the used sorbent, is passed from the gas/solids separator 239 to a calciner 272, preferably an indirect fired calciner such as operating at a temperature of greater than 850° C. and generally atmospheric pressure to effect regeneration of the sorbent via desorption of $CO_2$ from the sorbent. In FIG. 3, the calciner 272 and indirect heating assembly 273 are schematically shown as adjacent or in contact with each other and with a fuel or natural gas stream 274 and an oxidant or air stream 276 being introduced into the indirect heating assembly 273. Those skilled it the art and guided by the teachings herein provided, however, will understand and appreciate that the broader practice of the invention is not necessarily so limited as the invention can, if desired, be practiced employing other available heat sources such as including solar-derived heat sources, for example.

Material from the calciner 272 is passed as stream 291 to gas/solids separation processing 293 such as to separate the essentially pure desorbed $CO_2$ gas from regenerated sorbent solids.

A stream 286 of high purity $CO_2$ is passed to disposal or other uses.

A stream 280 of regenerated sorbent is passed back to the compact hydrogen generator 12.

A stream 296 of stack gases resulting from the indirect heating assembly 273 is passed to disposal or other uses, as may be desired or otherwise appropriate. In this regard, it may be desirable that such stack gases be subjected to heat recovery treatment prior to disposal or passage to other uses.

Figure 4:
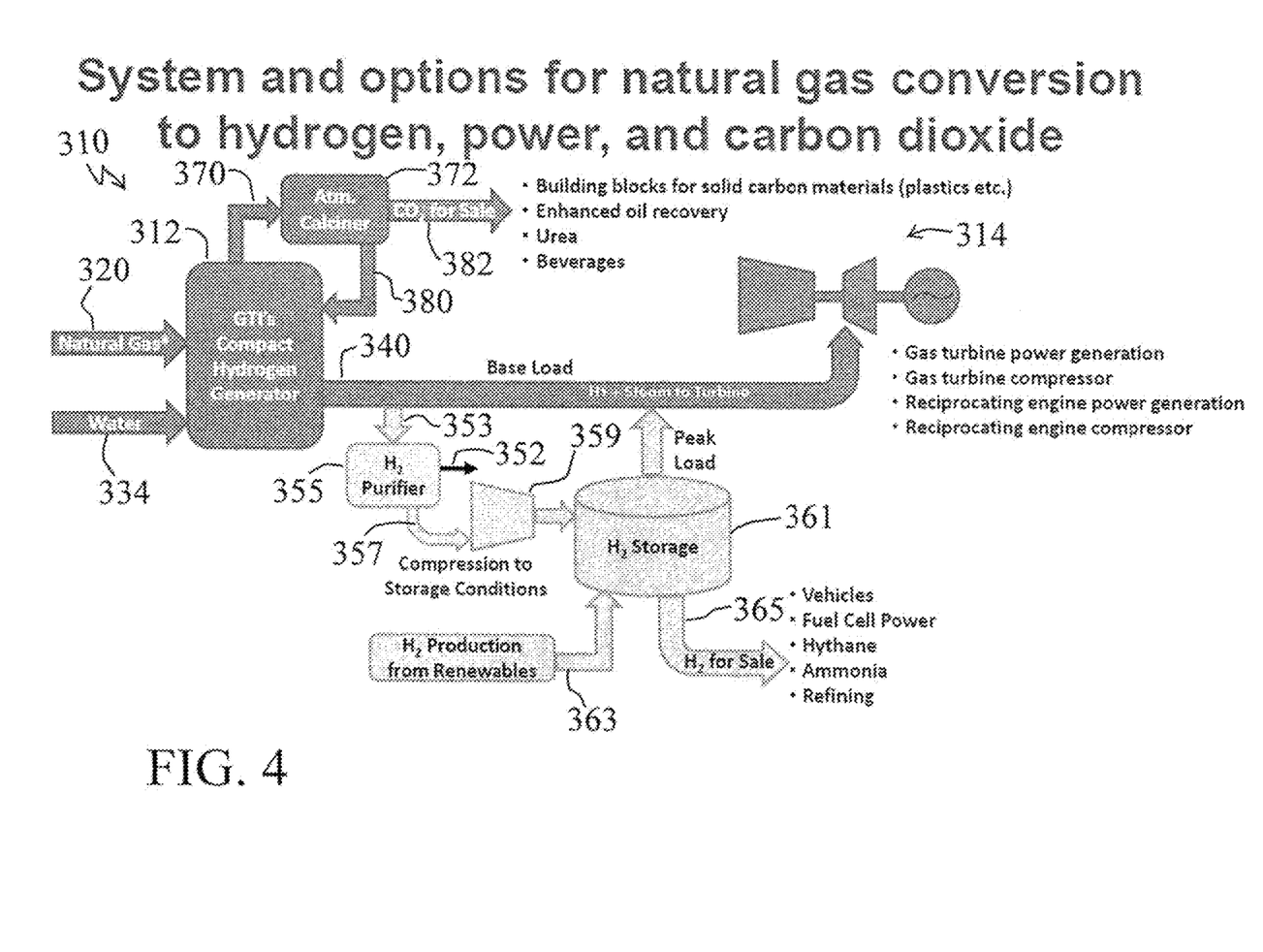
FIG. 4 is a simplified schematic for a system for converting natural gas assets to electric power, hydrogen and carbon dioxide, in accordance with another embodiment of the subject development.

Turning to FIG. 4 there is shown a schematic for a system, generally designated by the reference numeral 310, for converting natural gas assets to electric power, hydrogen and carbon dioxide, in accordance with another embodiment of the subject development.

The system 310 is in many respects similar to the systems 10 and 210 shown in FIG. 1 and FIG. 3, respectively and described above. For example, the system 310, includes a compact hydrogen generator 312 and a power generator 314, e.g., a hydrogen turbine.

Streams of methane-containing fuel 320, e.g., natural gas, such as possibly including renewable natural gas and biomethane, for example, and water, e.g., as steam, 334 are introduced into the hydrogen generator 312.

The compact hydrogen generator 312 produces a stream 340 containing the $H_2$-rich product and a stream 370 containing used sorbent, e.g., $CO_2$ desirably in a captured form with the absorbent, e.g., $CaCO_3$.

As identified above, such a $H_2$-rich product stream 340 is largely composed of $H_2$ and steam. The $H_2$-rich product stream 340, in whole or in part, can be appropriately supplied or provided to the power generator 314 to produce power. Suitable power generators in the broader practice of the invention encompass and may include turbines (including gas and hydrogen turbines), reciprocating engines, and the like such as may be suitably be connected to produce electrical and/or mechanical (i.e., shaft) power.

If desired, a portion of the $H_2$ product stream 340 can be diverted, such as represented by the stream 353. If desired, and as shown, such diverted $H_2$ product stream 353, in whole or in part, can be processed through a $H_2$ purifier 355, such as a pressure swing absorber, for example, such as to desirably increase or maximize hydrogen purity, forming a $H_2$ product stream 357 of increased purity and an off-gas stream 352 largely containing non-hydrogen gases.

The stream 357 of $H_2$ product of increased purity is then appropriately processed and conveyed such as by compression via compressor 359 to a storage vessel or chamber 361. Typical $H_2$ product storage conditions include: a pressure of greater than 2000 psia and up to 10,000 psia and ambient temperature, with a preferred pressure in a range of 3000-7000 psia or 4000-6000 psia, e.g., 5000 psia, and ambient temperature.

In accordance with one embodiment and as shown, the storage vessel 361 can provide for temporary storage of $H_2$ such that, for example, at times of high power demands, including peak load periods, $H_2$ from the storage vessel 461 can be provided to the hydrogen turbine 314, such as to supplement the $H_2$ introduced to the hydrogen turbine 314 directly from the compact hydrogen generator 312.

In one embodiment, and as shown, the $H_2$ stored or contained within the storage vessel 361 can, if desired, be provided or appropriately supplemented from other sources such as shown as 363, such as $H_2$ production from renewable, for example.

In one embodiment, and as shown, the $H_2$ stored or contained within the storage vessel 361 can, if desired, be passed or conveyed, such as represented by arrow 365, for alternative uses or processing. Examples of such alternative uses or processing include without limitation ammonia production, refining processing, hythane manufacture and production, fuel cell power applications, and motor vehicle energy supply, for example.

The stream 370 such as including used sorbent, e.g., sorbent material that absorbed $CO_2$, is passed from the compact hydrogen generator 312 to the calciner 372, preferably operating at atmospheric pressure to heat the used sorbent to desorb carbon dioxide from the used sorbent to produce regenerated sorbent. In one preferred embodiment, the calciner is an indirect heat calciner as such a calciner can desirably minimize and preferably avoid mixing or mingling of chemical species such as CO, $N_2$ and the like and such as may be produced or result from combustion processing such as combustion processing and such as may undesirably impact the purity of the $CO_2$ produced or resulting from practice of the subject development.

As described above, the calciner operates at a temperature sufficiently high, e.g., 900° C. for CaO sorbent, to effect regeneration of the sorbent via desorption of $CO_2$ from the sorbent.

Regenerated sorbent via a stream 380 is passed from the calciner 372 back to the compact hydrogen generator 312.

A stream 382 of high purity $CO_2$ is passed from the calciner 372 for subsequent processing, such as including heat recovery such as described above, and/or conveyance for other uses such as in one or more of enhanced oil recovery (EOR), urea production and processing, beverage production, and as or for building blocks for solid carbon materials such as plastics etc., for example.

Figure 5:
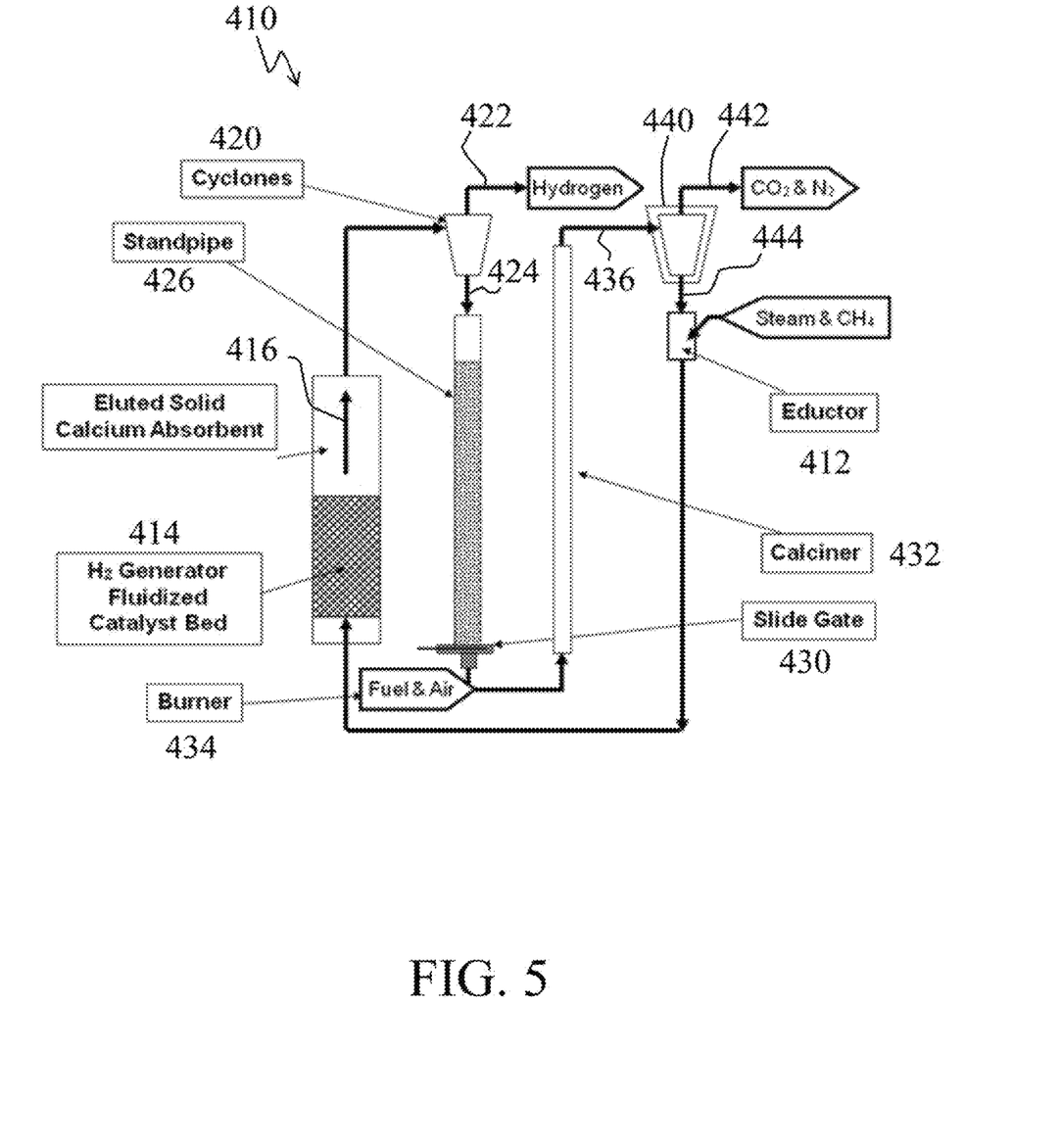
FIG. 5 is a simplified process schematic of a compact hydrogen generator in accordance with one aspect of the subject development.

Turning now to FIG. 5, there is shown a simplified process schematic of a compact hydrogen generator, generally designated by the reference numeral 410, and in accordance with one aspect of the subject development.

In the processing scheme 410, feed materials such as steam and methane are appropriately introduced such as via one or more educators 412 and ultimately passed to a compact hydrogen generator fluidized catalyst bed reactor 414. In accordance with one preferred embodiment such as described above, the compact hydrogen generator fluidized catalyst bed reactor 414 desirably forms or constitutes a sorbent enhanced reformer such as containing 1) reforming catalyst for the catalytic conversion of methane to desired $H_2$ product and 2) a quantity of a sorbent material to absorb carbon dioxide such as formed during such reforming processing.

The sorbent, e.g., CaO, used preferably has a fine particle size and is elutriated through the catalyst bed during which it absorbs or otherwise binds with or picks-up the $CO_2$ such as CaO converting to calcium carbonate ($CaCO_3$). Further, the catalyst material and the sorbent within the fluidized bed reactor are desirably designed and selected such that the used sorbent can elutriate out of the reactor and the catalyst material is sized to not elutriate out of the reactor and thus remains in the fluidized bed.

The $H_2$ product and the eluted solid used sorbent as represented by the arrow 416 are passed from the $H_2$ generator fluidized bed sorbent enhanced reformer reactor 414 to an appropriate gas/solids separator 420, in this case shown as a cyclone.

A primarily $H_2$ product gas and steam stream 422 is shown exiting from the gas/solids separator 420. As described above, such $H_2$ product can be subsequently appropriately further processed, stored, or used such as in conjunction with a $H_2$ turbine.

A used sorbent-containing solids stream 424 exiting from the gas/solids separator 420 is subsequently passed, such as via a standpipe 426 and slide gate 430 combination, to a calciner 432. The calciner 432 is also provided with combustion products, such as from a burner 434, to heat the used sorbent to desorb carbon dioxide from the used sorbent to produce regenerated sorbent.

An effluent stream 436 from the calciner 432 is passed to a gas/solids separator 440, for example, a cyclone, to effect separation of gaseous materials such as $CO_2$ and $N_2$, for example, from the now regenerated sorbent.

A gaseous materials stream 442, shown as exiting from the gas/solids separator 440, can be passed for subsequent appropriate further processing, storage, use, or disposal, as may be desired.

A solids materials stream 444, composed of the regenerated sorbent and shown as exiting from the gas/solids separator 440, can be passed to the educator 412 for subsequent conveyance via the steam and/or natural gas or methane introduced therein to the compact hydrogen generator fluidized catalyst bed reactor 414.

While the processing scheme 410 shown in FIG. 5 utilizes a direct fired calciner, an indirect fired calciner such as described above and shown in other embodiments can be used, particularly in those instances wherein the purity of resulting $CO_2$ is important or critical.

Those skilled in the art and guided by the teaching herein provided will understand and appreciate that reduced CAPEX and OPEX associated with a system with inherent carbon dioxide separation, such as herein described, desirably results in a lower cost of hydrogen compared to a traditional SMR. A 15% reduction in the cost of hydrogen is forecast for this technology, without taking any credit for the sale of co-produced carbon dioxide. This will enable the rapid commercial deployment of a technology suitable for producing a high hydrogen content fuel (including pure hydrogen) for use in advanced turbines. Hydrogen turbine utilization will be expanded resulting in increased demand and furthering commercial operating experience and performance improvements. Still further, a modular heat engine with inherent carbon dioxide separation, such as herein described, desirably meets an objective of developing a heat engine that promotes clean and efficient use of stranded fuel assets. In these stranded applications, natural gas may be cleanly and efficiently converted to electricity, while the carbon dioxide may be used nearby such as for enhanced oil and gas recovery, for example. By enabling the adoption of hydrogen turbines, even coal resources that might conventionally be referred to as "stranded coal" may be utilized in modular integrated gasification combined cycle (IGCC) applications. Further, if desired, the technology can be appropriately developed for modular and scalable heat engine/power systems sized appropriately for high impact enhanced oil and gas recovery applications.

In addition, other contemplated and herein encompassed and included applications for the subject development including the modular heat engine include the sale of excess hydrogen for use in fuel cell vehicles, or for oil refining/upgrading and fertilizer production. The hydrogen may also be blended with natural gas such as to make lower carbon intensity hythane. The resulting or produced high purity carbon dioxide can, as may be desired, be sold to or otherwise find application in other industries such as the urea and beverage industries, for example.

Moreover, the subject invention enhances the direct applicability and the economic benefits of using a CHG for producing a fuel source for electrical power production with the pre-combustion capture of $CO_2$. The availability of a proper mix of hydrogen and steam arising from the CHG directly as a fuel makes for an affordable solution to both control the combustion process and mitigate NOx formation.

Figure 6:
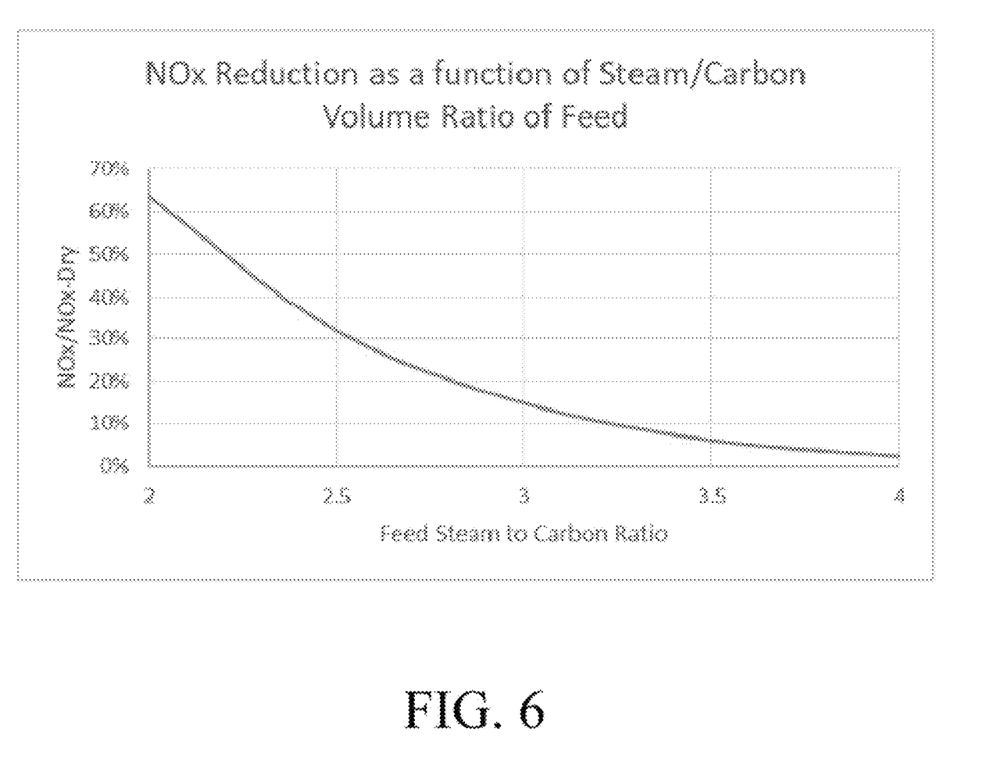
FIG. 6 is a graphical presentation of NOx/NOx-Dry versus steam/fuel mass ratio for both a standard configuration (Exp) and an $H_2$-Steam mixing (CFD) configuration where NOx/NOx-Dry represents the reduced fraction of NOx formed by the increase in the steam (diluent) concentration as the steam (feed)-to-carbon ratio is increased relative to the amount of NOx formed without any steam diluent (NOx-Dry).

In this regard, a 3:1 steam to carbon ratio going into the CHG results in in a NOx reduction of 85%, as shown in FIG. 6. FIG. 6 indicates the ability to control NOx formation within the operating steam to carbon feed ratio range for the CHG between 2.5:1 and 4:1. Hydrogen purity also increase with increasing steam to carbon feed ratio.

The subject development illustratively disclosed herein suitably may be practiced in the absence of any element, part, step, component, or ingredient which is not specifically disclosed herein.

While in the foregoing detailed description the subject development has been described in relation to certain preferred embodiments thereof, and many details have been set forth for purposes of illustration, it will be apparent to those skilled in the art that the subject development is susceptible to additional embodiments and that certain of the details described herein can be varied considerably without departing from the basic principles of the invention.

What is claimed is:

1. A system for power generation, the system comprising:
   a compact hydrogen generator, the compact hydrogen generator containing a quantity of a sorbent material and a reforming catalyst, wherein the compact hydrogen generator comprises a fluidized bed configured to fluidize both the reforming catalyst and the sorbent material in combination with a feed material, wherein the feed material comprises natural gas and steam, and wherein the feed material in contact with the reforming catalyst produces $H_2$ product and carbon dioxide and the sorbent material absorbs carbon dioxide and forms a used sorbent;
   a gas/solids separator connected to the compact hydrogen generator to separate the $H_2$ product and the used sorbent, wherein the reforming catalyst and the sorbent material are both fluidized in the bed and each of the reforming catalyst and the sorbent material has a corresponding size configured for the reforming catalyst to remain in the fluidized bed while the $H_2$ product and used sorbent are conveyed by elutriation from the fluidized bed to the gas/solids separator;
   a calciner connected to the gas/solids separator to heat the used sorbent to desorb carbon dioxide from the used sorbent to produce regenerated sorbent;
   a recycle line to introduce at least a portion of the regenerated sorbent from the calciner to the compact hydrogen generator; and
   at least one power generator to receive and utilize at least a portion of the $H_2$ product from the gas/solids separator to produce power.

2. The system of claim 1 wherein the feed material fluidizes the regenerated sorbent in the recycle line and delivers the regenerated sorbent to a bottom of the fluidized bed reactor.

3. The system of claim 1 wherein the compact hydrogen generator containing the sorbent material comprises a bubbling fluidized bed of the sorbent material and the reforming catalyst for catalytic conversion of methane to the $H_2$ product.

4. The system of claim 1 wherein the natural gas comprises sulfur, said system additionally comprises:
   a desulfurizer to remove sulfur from the natural gas prior to passage to the compact hydrogen generator.

5. The system of claim 1 wherein the calciner is an indirect heating calciner.

6. The system of claim 1 wherein the at least one power generator comprises a gas turbine or a hydrogen turbine and produces a flue gas, wherein said system additionally comprises a heat recovery steam generator connected to the at least one power generator to accept at least a portion of the flue gas, recover heat from the flue gas and generate steam.

7. The system of claim 1 wherein the compact hydrogen generator operates at a pressure of at least 35 psia to produce the $H_2$ product and carbon dioxide.

8. The system of claim 1 wherein the calciner operates at atmospheric pressure to heat the used sorbent to desorb carbon dioxide from the used sorbent to produce regenerated sorbent.

9. The system of claim 1 wherein the calciner heats the used sorbent to desorb carbon dioxide from the used sorbent.

10. The system of claim 1 additionally comprising:
    a $H_2$ purifier to purify at least a portion of the $H_2$ product from the gas/solids separator to form purified $H_2$ product;
    a storage vessel to temporarily store at least a portion of the purified $H_2$ product; and
    a first process line to selectively pass a portion of the temporarily stored $H_2$ product from the storage vessel to the at least one power generator.

11. The system of claim 1 wherein the at least one power generator is a turbine.

12. The system of claim 11 wherein the turbine is a hydrogen turbine.

13. The system of claim 1 wherein the at least one power generator is a reciprocating engine.

14. The system of claim 1 wherein the feed material produces generator products including $H_2$, the carbon dioxide, and steam, the gas/solids separator separates the used sorbent from the $H_2$ and steam, and the at least one power generator receives and utilizes at least a portion of the $H_2$ and steam from the gas/solids separator to produce power.

15. The system of claim 14 wherein the compact hydrogen generator has a steam to carbon ratio operating range between 2.5:1 to 4:1.

16. The system of claim 14 wherein the compact hydrogen generator produces generator products having a steam to hydrogen ratio, on a volume basis, of between 1:8 and 1:2.

17. A method for producing power via hydrogen gas with the system of claim 1, said method comprising:
    introducing the feed material into the compact hydrogen generator to produce the $H_2$ product and carbon dioxide, the compact hydrogen generator containing a quantity of the sorbent material to absorb carbon dioxide and form the used sorbent;
    introducing the $H_2$ product and used sorbent from the sorbent enhanced reformer to the gas/solids separator to separate the $H_2$ product from the used sorbent;
    introducing at least a portion of the separated $H_2$ product to the at least one power generator to produce the power;
    introducing at least a portion of the separated used sorbent to the calciner to heat the used sorbent to desorb carbon dioxide from the used sorbent to produce the regenerated sorbent and $CO_2$; and
    recycling the at least a portion of the regenerated sorbent to the sorbent enhanced reformer.

18. A method for producing power via hydrogen gas with the system of claim 14, said method comprising:
    introducing the feed material into the compact hydrogen generator to produce the products including $H_2$, carbon dioxide, and steam, the compact hydrogen generator containing the quantity of a sorbent material to absorb carbon dioxide and form a used sorbent;
    introducing the $H_2$, steam and used sorbent from the sorbent enhanced reformer to the gas/solids separator to separate the $H_2$ and steam from the used sorbent;
    introducing at least a portion of the separated $H_2$ and steam to the at least one power generator to produce power;
    introducing at least a portion of the separated used sorbent to the calciner to heat the used sorbent to desorb carbon dioxide from the used sorbent to produce regenerated sorbent and $CO_2$; and
    recycling at least a portion of the regenerated sorbent to the sorbent enhanced reformer,
    wherein the sorbent enhanced reformer has a steam to carbon ratio operating range between 2.5:1 to 4:1 or produces products having a steam to hydrogen ratio, on a volume basis, of between 1:8 and 1:2.

* * * * *